US012756288B2

(12) United States Patent
Lampe et al.

(10) Patent No.: US 12,756,288 B2
(45) Date of Patent: Oct. 6, 2026

(54) FREQUENCY DITHERING SYSTEMS AND METHODS

(71) Applicant: ANALOG DEVICES, INC., Wilmington, MA (US)

(72) Inventors: Benjamin Thomas Lampe, Wilmington, MA (US); Joseph Vanden Wymelenberg, Wilmington, MA (US)

(73) Assignee: ANALOG DEVICES, INC., Wilmington, MA (US)

( * ) Notice: Subject to any disclaimer, the term of this patent is extended or adjusted under 35 U.S.C. 154(b) by 268 days.

(21) Appl. No.: 18/585,031

(22) Filed: Feb. 22, 2024

(65) Prior Publication Data

US 2024/0297567 A1 Sep. 5, 2024

Related U.S. Application Data

(60) Provisional application No. 63/449,972, filed on Mar. 4, 2023.

(51) Int. Cl.
*H02M 1/00* (2006.01)

(52) U.S. Cl.
CPC ....... *H02M 1/0032* (2021.05); *H02M 1/0022* (2021.05); *H02M 1/0025* (2021.05)

(58) Field of Classification Search
CPC ............. H02M 1/0032; H02M 1/0022; H02M 1/0025; H02M 1/0035; H02M 1/44; H02M 1/0003; H03K 17/687
See application file for complete search history.

(56) References Cited

U.S. PATENT DOCUMENTS

| | | | | |
|---|---|---|---|---|
| 10,122,265 | B1 * | 11/2018 | Matthew | H02M 1/44 |
| 11,171,662 | B1 * | 11/2021 | Steensgaard-Madsen | H03M 1/468 |
| 2004/0032353 | A1 * | 2/2004 | Kattan | H03M 1/1057 341/131 |
| 2008/0084340 | A1 * | 4/2008 | Hurrell | H03M 1/0641 341/131 |
| 2023/0223987 | A1 * | 7/2023 | Chen | H02M 1/0025 375/130 |

* cited by examiner

*Primary Examiner* — Kyle J Moody
(74) *Attorney, Agent, or Firm* — DLA Piper LLP (US)

(57) ABSTRACT

Described herein are systems and methods that change trigger thresholds between switching cycles such as to prevent constant switching frequencies from creating noise in the audible range. In various embodiments this is accomplished by using different offset values to adjust threshold values of a comparator circuit to generate non-periodic trigger thresholds that are applied to a wake-up circuit.

18 Claims, 7 Drawing Sheets

400

100

200

300

400

6/7

600

FREQUENCY DITHERING SYSTEMS AND METHODS

CROSS REFERENCE TO RELATED PATENT APPLICATIONS

The present application claims priority benefit, under 35 U.S.C. § 119 (e), to and commonly-assigned U.S. Provisional Patent Application No. 63/449,972, filed on Mar. 4, 2023, entitled "FREQUENCY DITHERING SYSTEMS AND METHODS," and listing as inventors Benjamin Thomas Lampe and Joseph Vanden Wymelenberg, which application is herein incorporated by reference as to its entire content. Each reference mentioned in this patent document is incorporated by reference herein in its entirety.

BACKGROUND

A. Technical Field

The present disclosure relates generally to electrical switching circuits, such as low-power DC-DC converters, and more particularly, to systems, devices, and methods of cancelling unwanted effects of output ripple in noise-sensitive applications.

B. Background

In switching circuits, electric circuit components, such as ceramic output capacitors, that exhibit piezoelectric effects, are known to cause audible ringing under certain circumstances. The resulting noise is undesirable in many applications, including applications for "hearables" that use smart headsets, wireless headphones, and the like.

Unwanted audible side-effects caused by the switching off and on for certain periods of time of internal circuitry, such as sub-circuits, is oftentimes the result of low-power chip design that seeks to save energy, e.g., to increase battery life. Therefore, it is desirable to have systems and methods to alleviate the shortcomings of existing circuits.

BRIEF DESCRIPTION OF THE DRAWINGS

References will be made to embodiments of the invention, examples of which may be illustrated in the accompanying figures. These figures are intended to be illustrative, not limiting. Although the invention is generally described in the context of these embodiments, it should be understood that it is not intended to limit the scope of the invention to these particular embodiments. Items in the figures are not to scale.

DETAILED DESCRIPTION OF EMBODIMENTS

Figure 1:
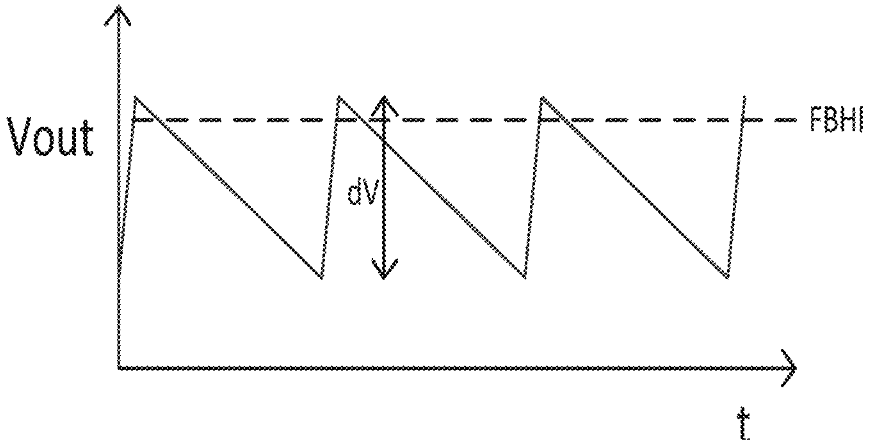
FIGURE 1 (PRIOR ART)
FIG. 1 depicts conventional wake-up cycles in a DC/DC converter using a comparator circuit.

In the following description, for purposes of explanation, specific details are set forth in order to provide an understanding of the invention. It will be apparent, however, to one skilled in the art that the invention can be practiced without these details. Furthermore, one skilled in the art will recognize that embodiments of the present invention, described below, may be implemented in a variety of ways, such as a process, an apparatus, a system, a device, or a method on a tangible computer-readable medium.

Components, or modules, shown in diagrams are illustrative of exemplary embodiments of the invention and are meant to avoid obscuring the invention. It shall also be understood that throughout this discussion that components may be described as separate functional units, which may comprise sub-units, but those skilled in the art will recognize that various components, or portions thereof, may be divided into separate components or may be integrated together, including integrated within a single system or component. It should be noted that functions or operations discussed herein may be implemented as components. Components may be implemented in software, hardware, or a combination thereof.

Furthermore, connections between components or systems within the figures are not intended to be limited to direct connections. Rather, data between these components may be modified, re-formatted, or otherwise changed by intermediary components. Also, additional or fewer connections may be used. It shall also be noted that the terms "coupled," "connected," or "communicatively coupled" shall be understood to include direct connections, indirect connections through one or more intermediary devices, and wireless connections.

Reference in the specification to "one embodiment," "preferred embodiment," "an embodiment," or "embodiments" means that a particular feature, structure, characteristic, or function described in connection with the embodiment is included in at least one embodiment of the invention and may be in more than one embodiment. Also, the appearances of the above-noted phrases in various places in the specification are not necessarily all referring to the same embodiment or embodiments.

The use of certain terms in various places in the specification is for illustration and should not be construed as limiting. A service, function, or resource is not limited to a single service, function, or resource; usage of these terms may refer to a grouping of related services, functions, or resources, which may be distributed or aggregated.

The terms "include," "including," "comprise," and "comprising" shall be understood to be open terms and any lists the follow are examples and not meant to be limited to the listed items. Any headings used herein are for organizational purposes only and shall not be used to limit the scope of the description or the claims. Each reference mentioned in this patent document is incorporate by reference herein in its entirety.

One skilled in the art shall recognize that: (1) certain steps may optionally be performed; (2) steps may not be limited to the specific order set forth herein; (3) certain steps may be performed in different orders; and (4) certain steps may be done concurrently. Furthermore, it is noted that embodiments described herein are framed in the context of frequency dithering as applied to DC-to-DC converters, but one skilled in the art shall recognize that the teachings of the present disclosure are not limited to any type of switching regulator, sleep mode circuit, frequency range, or particular application. Accordingly, the teachings of the present disclosure may be used in other contexts that may benefit from spreading energy over a range of frequencies within a frequency spectrum, for example, to reduce frequency peaks, prevent artifacts in output signals, and so on.

Existing low-power chip designs achieve a relatively low current, and cut down on quiescent currents that otherwise would reduce efficiency, by shutting down most internal circuitry except for a relatively small comparator circuit. FIG. 1 depicts conventional wake-up cycles in a DC/DC converter using a comparator circuit. FIG. 1 illustrates the effect of the comparator circuit on the output voltage. Once the comparator circuit detects that the output voltage, $V_{OUT}$, has drooped to or below a nominal voltage value, the circuit enters a wake-up state to generate one or more voltage pulses that relatively quickly charge the circuit back to $V_{OUT}$. Because the differential voltage by which the output voltage droops typically is fixed, e.g., 10 mV, in instances where the circuit operates at a constant load current, the time it takes the output voltage to reach the nominal voltage value in each cycle, i.e., the time for the comparator to generate a signal to wake up the circuit, is substantially fixed. This causes the (sub-) circuits in the chip to switch on and off at a substantially constant frequency.

Figure 2:
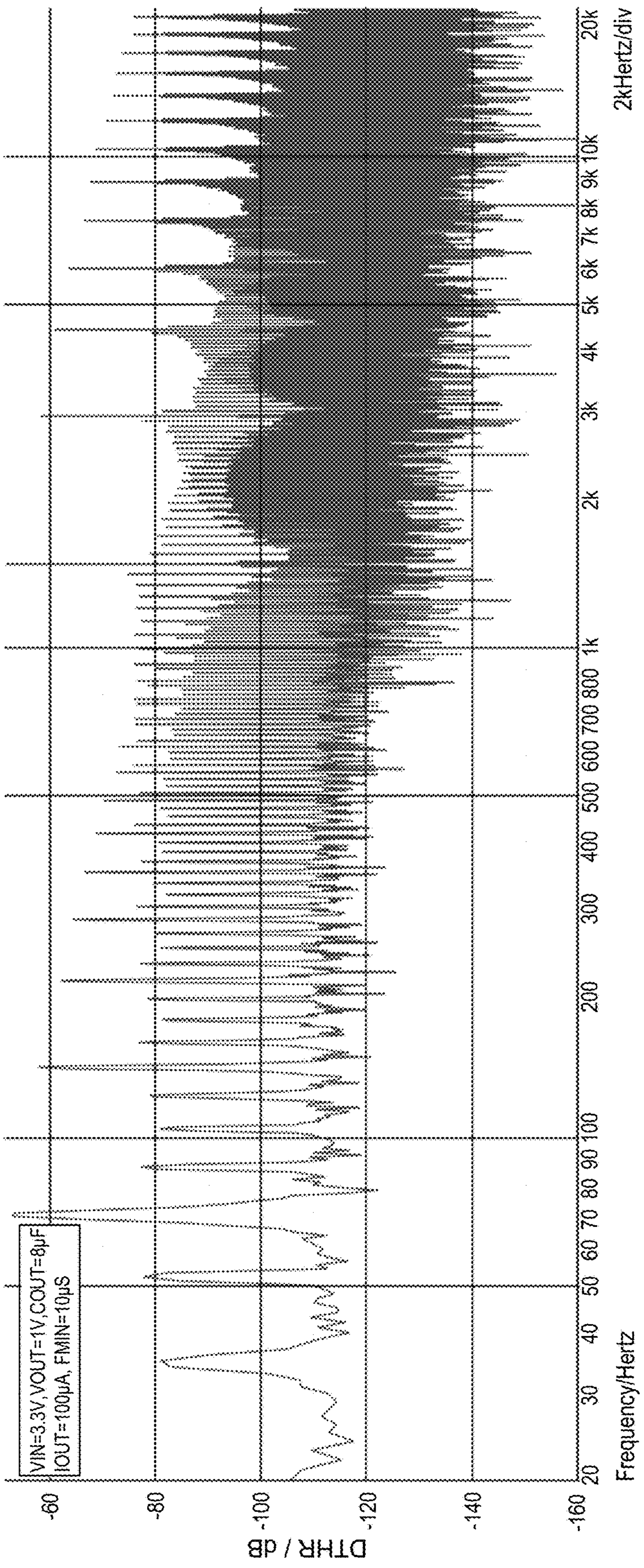
FIGURE 2 (PRIOR ART)
FIG. 2 depicts unwanted tones in the audible frequency spectrum created by the operation of the comparator circuit described with reference to FIG. 1.

Since, especially for lower load currents, it takes longer to discharge the output capacitor and reach the comparator's threshold, the switching frequency is drastically reduced. As a result, the charging and discharging, e.g., of a ceramic output capacitor of a DC-DC converter, may occur at a relatively low fixed frequency. This may cause the capacitor to ring at a tone that falls within the audible range of 20 Hz-20 kHz corresponding to the low switching frequency in the kHz range illustrated in FIG. 2, rather than the MHz switching frequency range that is more typical for such circuits.

Figure 3:
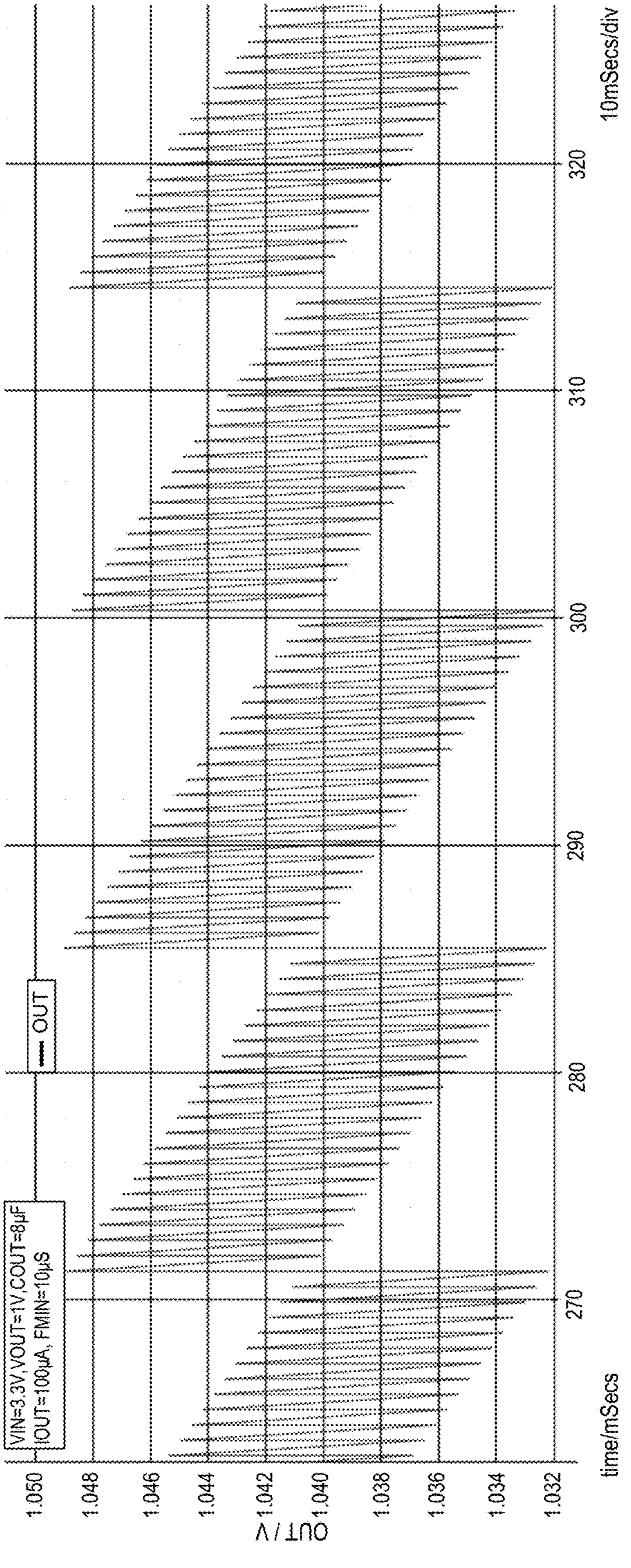
FIGURE 3 (PRIOR ART)
FIG. 3 depicts simulation results that illustrate the formation of sub-harmonics created by the comparator circuit described with reference to FIG. 1.

Another unwanted side-effect a of constant load current is that additional lower-frequency patterns and sub-harmonics may form. FIG. 3 depicts simulation results that illustrate the creation of such sub-harmonics in the output spectrum that may be created by common switching circuit when operating in low-power applications. As depicted, if, during the on-time, the output voltage decays over time such that the threshold to enter sleep mode has not been reached, an additional second rising pulse may be applied to supply sufficient energy to the output.

Some approaches that attempt to mitigate audible noise caused by switching circuits dither the timing of the pulses that charge the offending capacitor to its output voltage. However, since the on-time during which dithering occurs during the rising slope is relatively small when compared to the switching period itself, most of the duration of the period is spent on waiting for the output voltage to fall by some threshold value. However, because in low-power applications the switching frequency is dominated by the off-time, i.e., a relatively constant time for VOUT to droop, dithering during the rising slope of the output voltage during the relatively fast on-time of the DC-to-DC converter is, thus, ineffective in sufficiently changing the switching frequency to eliminate unwanted tones created.

Other approaches employ an ultrasonic mode that is designed to shift switching frequencies to a range of the spectrum that lies above the frequency range audible to the human ear. However, such methods are also not well-suited for low-power applications as the decreased time that is spent in sleep mode between pulses and the increased energy cost associated with higher switching losses provide a costly tradeoff for the achieved noise reduction. Yet other approaches that employ noise-reducing circuitry, such as LDOs, are also not suitable for low-power applications as, in addition to occupying valuable space on the chip and increasing overall cost, they suffer from an overall reduction in efficiency. Therefore, it would be desirable to have low-power, low-cost solutions that efficiently reduce or eliminate unwanted acoustic side-effects of electric circuits and circuit components, especially in noise-sensitive applications, such as hearables.

Figure 4:
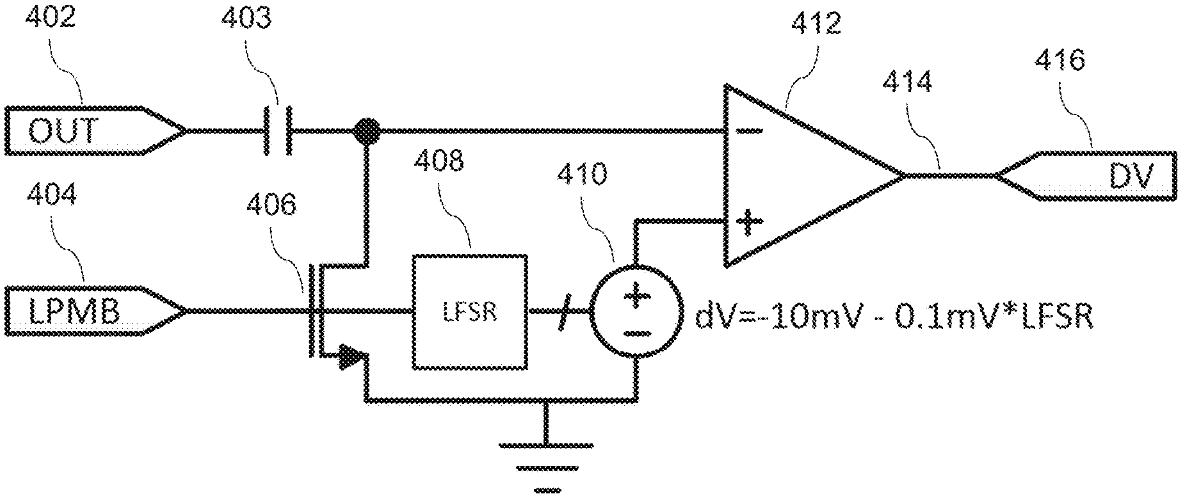
FIG. 4 is a schematic of an illustrative dithering circuit according to various embodiments of the present disclosure.

FIG. 4 is a schematic of an illustrative dithering circuit according to various embodiments of the present disclosure. Dithering circuit 400 comprises an output voltage signal 402, a capacitor 403, a low-power mode signal 404, a switch 406, an offset generator 408 that is implemented as a linear feedback shift register (LFSR), a voltage threshold circuit 410, a comparator circuit 412 having a comparator output 414 that is coupled to a sleep state latch 416, which comprises a set, reset, Q, and output terminal. Comparator circuit 412 may be implemented as a difference voltage comparator, a voltage shift detector, an output shift detector, and the like. Offset generator 408 may be implemented in hardware, e.g., as an LFSR or any other logic circuit comprising a common shift register whose bits are shifted or fed back to an input to produce a random or pseudo-random sequence of offset values that are a linear function of a current or previous state of the LFSR. One skilled in the art shall understand that offset generator 408 may be any kind of block that can generate a random or pseudo-random sequence of offsets, and may or may not need to depend on the current or previous state, although the specific embodiment as an LFSR does depend on current or previous state.

In operation, comparator circuit 412 detects when a voltage at its negative input, here, the voltage present at output capacitor 403, has fallen by an amount equal to a threshold voltage "dV" that is defined by threshold circuit 410, which, in embodiments, combines two voltage components, a predetermined value (e.g., ++a user-adjustable voltage between 10 mV and 30 mV) and an offset value generated by offset generator 408. In response to determining that the threshold voltage has been reached or exceeded, comparator circuit 412 may output wake-up signal 414 that is provided to sleep state latch 416, e.g., to control a DC-DC converter (not shown in FIG. 4) such as to terminate a low-power mode and commence a new switching cycle that recharges capacitor 403 to a value equal or greater than a nominal output value. In embodiments, wake-up signal 414 may be provided to the reset line of latch 416 to reset the sleep state. In embodiments, once comparator output 414 exceeds a threshold, sleep state latch 416 may cause some or all internal circuitry, except comparator circuit 412, to shut down, e.g., once capacitor 403 reaches some nominal output value.

In embodiments, in response to low-power mode signal 404 indicating that a low-power mode is enabled, offset generator 408 may generate, e.g., in each cycle, an offset value that voltage threshold circuit 410 may combine with the predetermined value to create relatively small threshold values that may be pseudo-random in nature and may vary from one cycle to the next. In embodiments, comparator circuit 412 may use the different threshold values, e.g., to adjust, in different cycles, off-times of a wake-up circuit in the DC-DC converter that is controlled by comparator circuit 412. In embodiments, dithering the threshold value between cycles to vary the off-times, in this manner, affects the switching frequency of the circuit such that, even at constant load conditions, energy will steer the circuit away from a fixed threshold value that, otherwise, would cause a continuous switching at a substantially fixed, predictable frequency and create fixed-frequency output ripples that may result in unwanted audible fixed-frequency tones. In effect, dithering circuit 400 spreads energy to a broader frequency spectrum, such that unwanted tones in the audible frequency range are actively prevented.

It is noted that circuit 400 in FIG. 4 is not limited to the constructional detail shown there or described in the accompanying text. As those skilled in the art will appreciate, a suitable dithering circuit may comprise additional circuit components such as a controller, logic gates, clocks, and so on.

Figure 5:
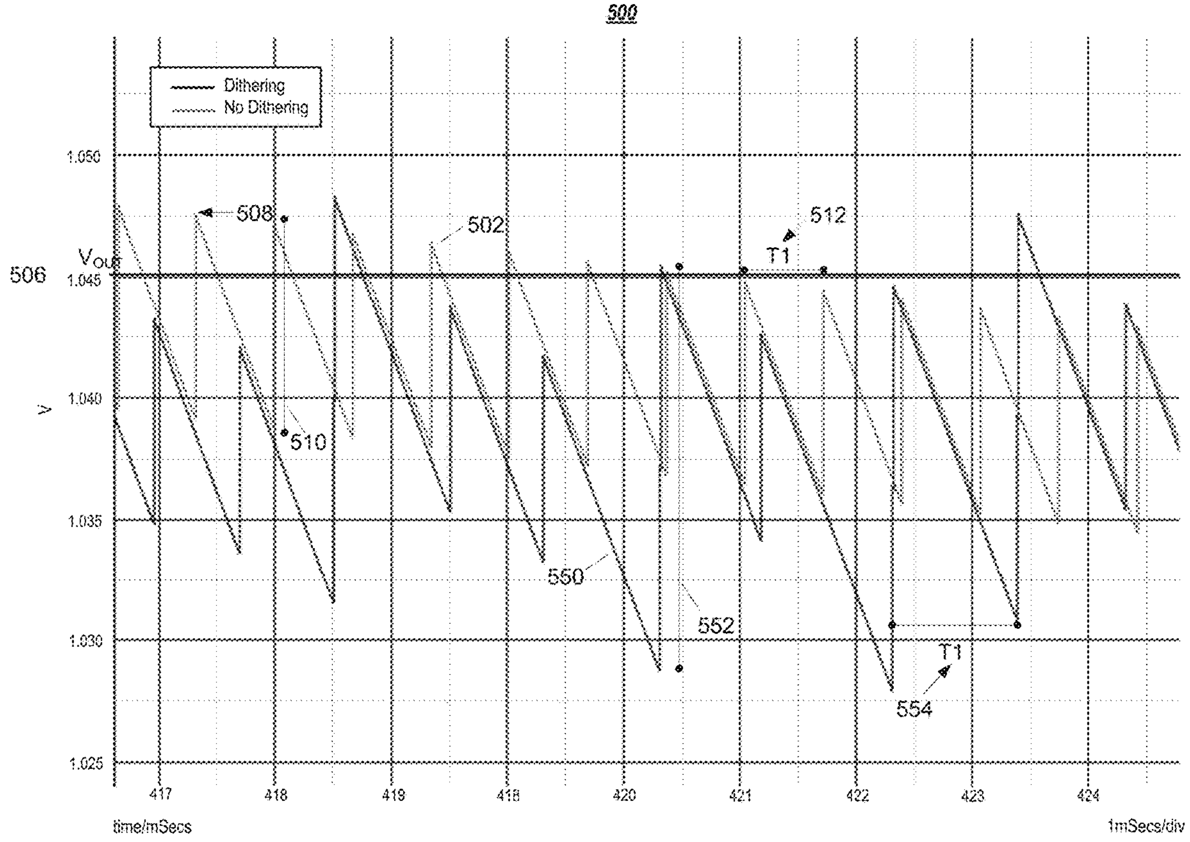
FIG. 5 illustrates wake-up cycles in a DC/DC converter using a dithering circuit according to various embodiments of the present disclosure.

FIG. 5 illustrates wake-up cycles in a DC/DC converter using a dithering circuit according to various embodiments of the present disclosure. For comparison, voltage 502 is superimposed on voltage 550. As indicated by FIG. 5, if a dithering method is not employed, in embodiments, an output capacitor may by charged to a value 508 that is slightly greater than a target value 506, $V_{OUT}$, to exceed $V_{OUT}$ by a few percent (e.g., 5%).

Once voltage 502 falls by a fixed threshold value 510, the comparator may output a signal to indicate that internal circuits should be turned back on to recharge the output capacitor. The substantially fixed periods (e.g., 512) between cycles lead to fixed-frequency output ripples and, thus, unwanted frequency tones, as previously mentioned with reference to FIG. 1.

In contrast, threshold value (e.g., 552) generated by a dithering circuit, such as that shown in FIG. 4, is variable between cycles, thus, leading to variable periods (e.g., 554) between cycles. Advantageously, this prevents undesirable audible fixed-frequency tones and their sub-harmonics from forming and spreads the energy to a wider frequency spectrum.

Figure 6:
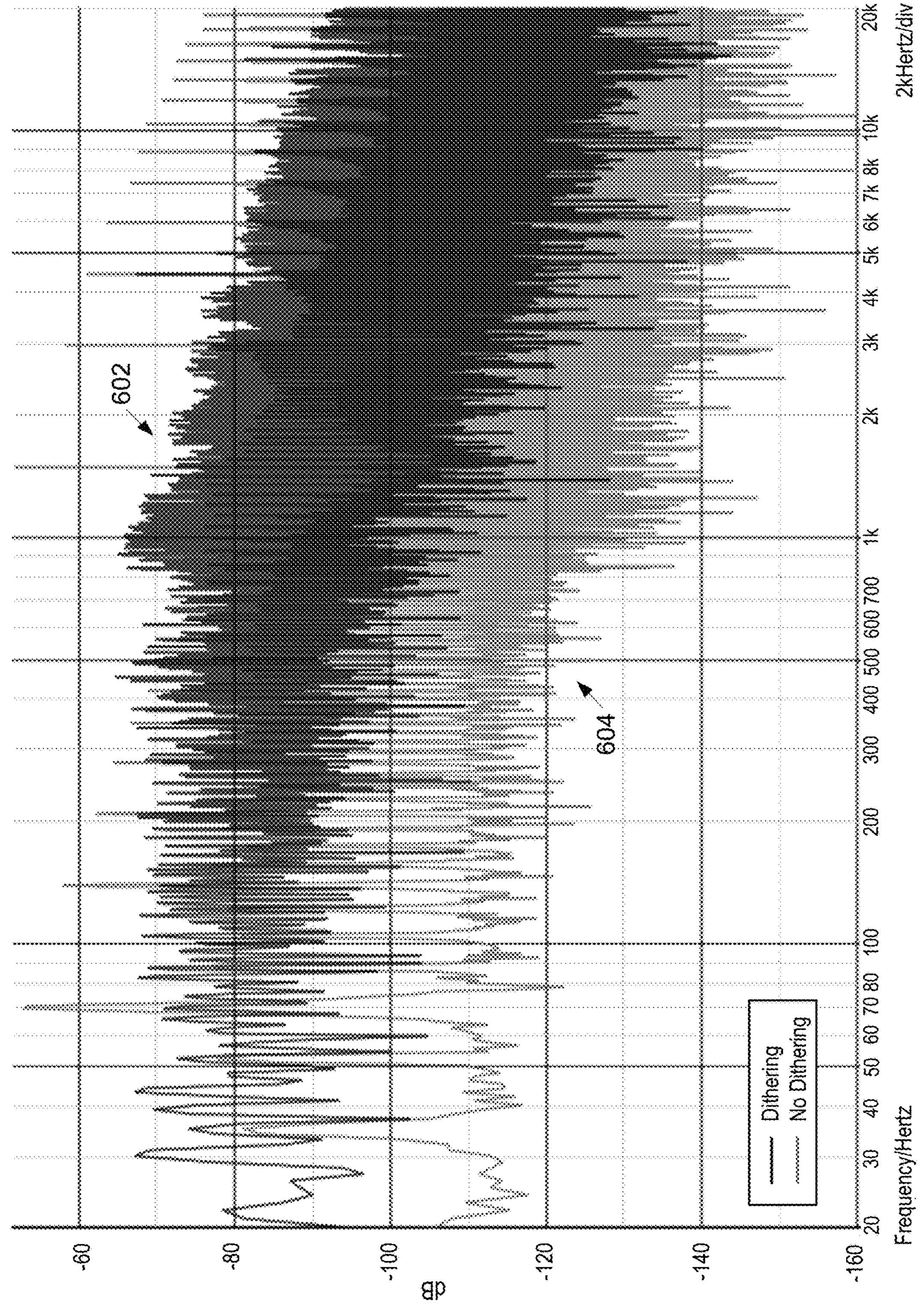
FIG. 6 shows simulation results illustrating the effect of a dithering circuit on the audible frequency spectrum, according to various embodiments of the present disclosure.

An exemplary frequency spectrum is shown in FIG. 6, which illustrates the effect that the dithering circuit has on the audible frequency spectrum. Plot 602 represents results for a dithering circuit according embodiments herein, whereas plot 604 represents results for a common design not utilizing such dithering circuitry. As can be seen in FIG. 6, while the overall noise floor rises for plot 602 when compared with plot 604, the tones in the output spectrum are significantly suppressed by about 10 dB.

It shall be noted that the simulation results in FIG. 5 and FIG. 6 are provided by way of illustration and were performed under specific conditions using a specific embodiment or embodiments; accordingly, neither these experiments nor their results shall be used to limit the scope of the disclosure of the current patent document.

Figure 7:
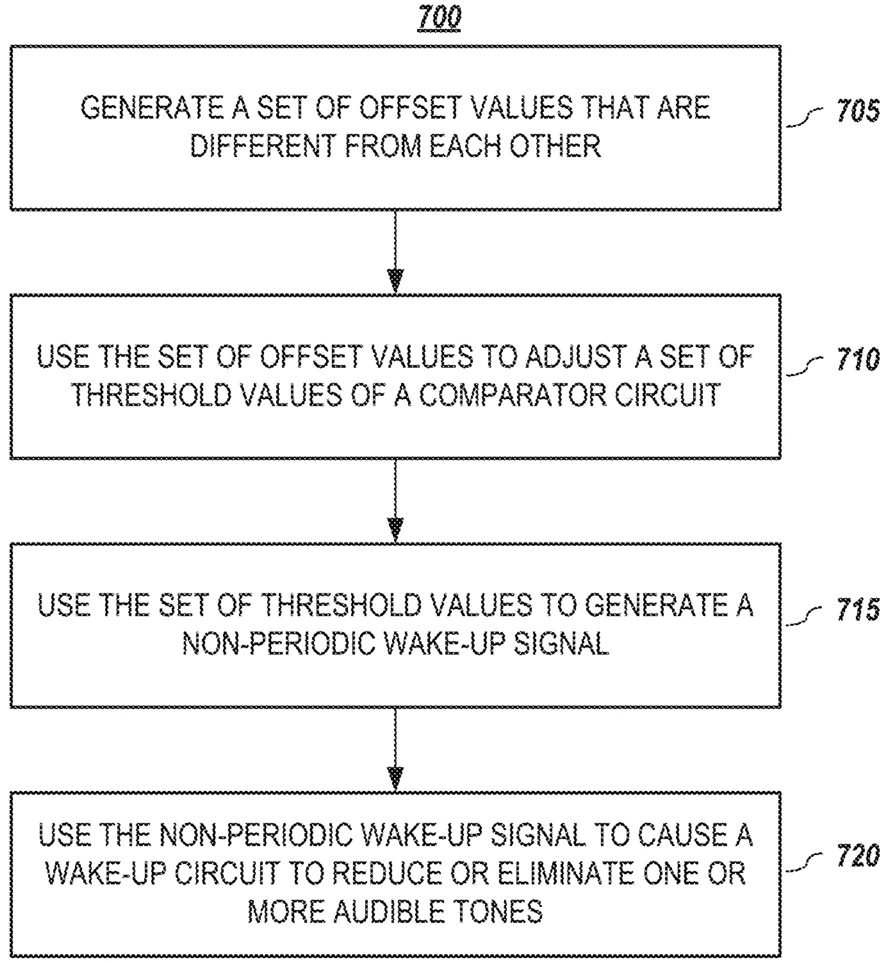
FIG. 7 is a flowchart of an illustrative dithering process in accordance with various embodiments of the present disclosure.

FIG. 7 is a flowchart of an illustrative dithering process in accordance with various embodiments of the present disclosure. In embodiments, the dithering process may start at step 705 when a set of offset values that are different from each other is generated.

At step 710, the offset values may be used to adjust a set of threshold values of a comparator circuit.

At step 715, the values may then be used to generate a non-periodic wake-up signal that, at step 720, may be uses to cause a wake-up circuit to reduce or eliminate any number of audible tones.

One skilled in the art will recognize no computing system or programming language is critical to the practice of the present invention. It will be appreciated to those skilled in the art that the preceding examples and embodiments are exemplary and not limiting to the scope of the present disclosure. It is intended that all permutations, enhancements, equivalents, combinations, and improvements thereto that are apparent to those skilled in the art upon a reading of the specification and a study of the drawings are included within the true spirit and scope of the present disclosure. It shall also be noted that elements of any claims may be arranged differently including having multiple dependencies, configurations, and combinations.

What is claimed is:

1. A dithering circuit for low-power applications, the dithering circuit comprising:
- an offset generator configured, in different cycles, to output different offset values; and
- a comparator circuit coupled to the offset generator, the offset generator further configured to control the comparator circuit to perform steps comprising:
  - receiving threshold values adjusted based on the different offset values; and
  - using the threshold values to generate a non-periodic output signal, wherein the offset generator is configured to generate, for a first cycle, a first offset and, for a second cycle, a second offset, and wherein the voltage threshold circuit is configured to output, in the first cycle, a first threshold, and, in the second cycle, a second threshold.

2. The dithering circuit of claim 1, wherein the offset generator is implemented as a linear feedback shift register (LFSR) configured to create the different offset values.

3. The dithering circuit of claim 1, further comprising a wake-up circuit configured to use the non-periodic output signal to cause a DC-to-DC converter to wake-up in non-periodic intervals such as to spread an energy associated with a switching frequency over a range of frequencies in a frequencies spectrum to suppress one or more audible tones.

4. The dithering circuit of claim 1, wherein the offset generator is configured to output the different offset values in response to receiving a signal that indicates that the dithering circuit is in a low-power mode.

5. The dithering circuit of claim 1, wherein the offset generator is configured to randomize the threshold values by using a randomized code to generate the different offset values.

6. The dithering circuit of claim 5, wherein the offset generator is configured to generate the randomized code by using a counter that dithers between two or more bit values.

7. A dithering method for reducing audible noise in low-power switching circuits, the method comprising:
- generating a set of offset values that are different from each other, wherein the generating the set of offset values comprises:
  - generating a first offset for a first cycle; and
  - generating a second offset for a second cycle;
- using the set of offset values to adjust a set of threshold values of a comparator circuit, wherein the set of threshold values comprises a first threshold in the first cycle and a second threshold in the second cycle;
- using the set of threshold values to generate a non-periodic wake-up signal; and
- using the non-periodic wake-up signal to cause a wake-up circuit to reduce or eliminate one or more audible tones.

8. The dithering method of claim 7, further comprising using the wake-up signal to operate a DC-to-DC converter without the comparator circuit triggering at the same times in two subsequent cycles to spread an energy associated with a switching frequency over a range of frequencies in a frequencies spectrum thereby suppressing one or more audible tones.

9. The dithering method of claim 7, wherein the set of offset values are generated by an offset generator that is implemented as a linear feedback shift register (LFSR).

10. The dithering method of claim 9, wherein the offset generator uses a randomized code to generate the different offset values, the offset values randomizing the threshold values.

11. The dithering method of claim 10, wherein the offset generator generates the randomized code by using a counter that dithers between two or more bit values.

12. The dithering method of claim 9, wherein the offset generator generates the different offset values in response to receiving a signal that indicates that the dithering circuit is in a low-power mode.

13. A dithering circuit comprising:

a voltage threshold circuit configured to output a threshold voltage based on an offset that has different offset values in different switching cycles, the threshold voltage having different threshold values in different switching cycles; and a comparator circuit configured to compare the threshold voltage to a voltage present in an input of the comparator circuit to generate a comparator output, wherein the offset generator is configured to generate, for a first cycle, a first offset value and, for a second cycle, a second offset value, and wherein the voltage threshold circuit is configured to output, in the first cycle, a first threshold value, and, in the second cycle, a second threshold value.

14. The dithering circuit of claim 13, further comprising an offset generator that is implemented as a linear feedback shift register (LFSR) configured to create the different offset values.

15. The dithering circuit of claim 14, wherein the offset generator is configured to output the offset in response to receiving a signal that indicates that the dithering circuit is in a low-power mode.

16. The dithering circuit of claim 14, wherein the offset generator is configured to randomize the threshold voltage by using a randomized code to generate the different offset values.

17. The dithering circuit of claim 16, wherein the offset generator is configured to generate the randomized code by using a counter that dithers between two or more bit values.

18. The dithering circuit of claim 13 further comprising:

a wake-up circuit configured to use the comparator output to cause a DC-to-DC converter to wake up in non-periodic intervals such as to spread an energy associated with a switching frequency over a range of frequencies in a frequencies spectrum to suppress one or more audible tones.

* * * * *